United States Patent [19]

Papuchon et al.

[11] Patent Number: 4,778,234

[45] Date of Patent: Oct. 18, 1988

[54] INTEGRATED OPTICS POLARIZING DEVICE

[75] Inventors: Michel Papuchon, Issy-Les-Moulineaux; Sylvie Vatoux, Orsay, both of France

[73] Assignee: Thomson CSF, Paris, France

[21] Appl. No.: 22,510

[22] Filed: Mar. 9, 1987

Related U.S. Application Data

[63] Continuation of Ser. No. 615,907, May 31, 1984, abandoned.

[30] Foreign Application Priority Data

Jun. 17, 1983 [FR] France ............................ 83 10068

[51] Int. Cl.[4] .............................................. G02B 5/30
[52] U.S. Cl. .............................. 350/96.12; 350/96.11
[58] Field of Search ............... 350/96.11, 96.12, 96.13, 350/96.14

[56] References Cited

U.S. PATENT DOCUMENTS

| | | | |
|---|---|---|---|
| 3,857,689 | 12/1974 | Koizumi et al. | 65/30 |
| 4,181,515 | 1/1980 | Dyott et al. | 350/96.14 X |
| 4,284,663 | 8/1981 | Carruthers et al. | 427/164 |
| 4,400,052 | 8/1983 | Alferness et al. | 350/96.11 X |

FOREIGN PATENT DOCUMENTS

2286396 4/1976 France .

OTHER PUBLICATIONS

"Ion Implantation and Integrated Optics", by Townsend, Journal of Physics E Scientific Instruments, vol. 10, No. 3, Mar. 1977, pp. 197–203.
"Normal-Mode Analysis of Semi-Leaky Type Anisotropic Thin-Film Optical Waveguides and Their Application of Thin-Film Mode Filter", by Y. Okamura et al., The Transactions of the IECE of Japan, vol. E 59, No. 4, Apr. 1976, p. 30.
"Fabrication and Characterization of Titanium Indiffused Proton Exchanged (Tipe) Waveguides in Lithium Niobate", Optics Communications, vol. 42, No. 2, Jun. 15, 1982, pp. 101–103.
Applied Physics Letters, vol. 25, No. 5, Sep. 1, 1974, p. 308, Noda, J., Saku, T., Uchida, N., "Fabrication of Optical Waveguiding Layer in $LiTaO_3$ by CU Diffusion".
Review of the Electrical Communication Labs., vol. 26, Nos. 3-4, Mar.-Apr., 1978, p. 557, UEHARA, S, UESUGI, N., "Optical Waveguide Polarizer Using Anisotropic Crystal".
Appl. Phys. Lett., vol. 41, No. 7, Oct. 1, 1982, p. 607, Jackel, J. L., Rice, C. E., Veselka, J. J. "Proton Exchange for High-Index Waveguides in $LiNbO_3$".

*Primary Examiner*—John Lee
*Attorney, Agent, or Firm*—Cushman, Darby & Cushman

[57] ABSTRACT

An integrated optics polarizing device having a flat substrate made for example from lithium niobate, in which an integrated wave guide has been created by doping with titanium ions and one or more so called interaction regions interacting on the wave, formed within the material of the substrate, and having refraction indices such that a wave with a first polarization direction propagates in a guided mode in said wave guide and a wave with an orthogonal polarization is extinguished. Said interaction regions are obtained by modifying the material of said substrate in a controlled way by doping or ion substitution.

9 Claims, 2 Drawing Sheets

INTEGRATED OPTICS POLARIZING DEVICE

This is a continuation of application Ser. No. 615,907 filed May 31, 1984 which was abandoned.

BACKGROUND OF THE INVENTION

1. Field of the invention

The present invention relates to an integrated optics polarizing device, based on a structure comprising a flat substrate in which a wave guide has been formed.

The invention also relates to a process for manufacturing such a device.

In numerous applications, polarizing optical elements are required. In recent techniques using optical fibres and/or integrated optics wave guides, it is further necessary to match these elements as well as possible to these structures and to their particular geometries and dimensions so that optical couplings may be optimized.

2. Description of the Prior Art

The devices used for polarizing light are divided into two main families: devices with selective absorption depending on the polarization, and devices with spatial polarization separation.

Devices of the first type have been more especially based on optical fibres. By way of example, among others, such a device has been described in the article by HOSAKA et al/ "Single-mode Fiber-Type Polarizer" appearing in the publication "IEEE Transactions on microwave theory and techniques", volume MTT30, no. 20 10, 1982.

Polarizers of this type comprise an optical fiber made from silica bared over a few centimeters, which, in this bared region, is subjected to polishing so that the air-silica interface is a flat diopter. A metal deposit is formed on this flat diopter.

The guided light wave may always be divided into a substantially transverse-magnetic polarization component and a substantially transverse-electric component.

The first component couples to a plasmon of the silica-metal interface, which plasmon is propagated while undergoing high attenuation. The first component is then attenuated in the same way. The second component, transverse-electric polarization component, on the other hand only undergoes low attenuation.

The attenuation rates obtained are typically of the order of 30 db. They depend naturally on the quality of the machining of the optical fiber and on the exact position of the interface with respect to the core region of this fiber.

The losses undergone by the second component are small on the other hand, typically of the order of 1 db $cm^{-1}$.

Devices of the second family, i.e. devices with spatial polarization separation, have been formed either with an optical fiber structure base, or with a base of an optical wave guide structure integrated on a substrate. In these two variants, a birefringent crystal is disposed on a flat diopter adjacent either the core for an optical fiber or the integrated wave guide.

When it is a question of an optical fiber, this latter is first of all subjected to polishing, as was mentioned above, so as to create the flat diopter.

The birefringent crystal is chosen so that a first component of a given polarization light is propagated in a medium with a refraction index greater than the effective index of its guided propagation and so that another component, with orthogonal polarization, is propagated with a lower index.

Thus, the first component is no longer guided in the interaction zone with the birefringent crystal and is refracted therein. The second component, on the other hand, remains guided and passes through the interaction region without loss of energy other than the current transmission losses due to the guide or to the core of the fiber. These losses are in general negligible.

Attenuation rates of the order of 60 db or more may be obtained.

Polarizers of this type are described by way of examples, among others, in the article by BERGH et al: "Single-mode fiber-optic polarizer" appearing in the review "Optics Letters", vol. 5, no. 11, page 479, 1980, in so far as an optical fiber polarizer is concerned and in the article by UEHARA et al: "Optics Waveguiding polarizer" appearing in the review "Optics Letters", vol. 13, page 1753, 1974, in so far as the integrated optic devices are concerned.

The devices of the prior art which have just been described, although offering good performances, are however delicate to construct.

In so far as optical fibers are concerned, the machining for obtaining a flat diopter must be controlled with a very high accuracy during polishing. The position of the plane of the diopter must be determined with an accuracy on the order of a micrometer.

For optical fiber devices and integrated optics devices, it is difficult to obtain an appropriate crystal for all applications.

In fact, the conditions which the refraction indices must satisfy do not always correspond to existing crystals, at least crystals easy to machine and use.

Finally, in so far as the light wave guides are constructed in the form of an integrated optical structure, they are generally obtained by processes of the type in which a material, for example titanium, is thermally diffused in a surface region of a flat substrate, for example of lithium niobate.

This procedure may cause a modification of the surface state of this substrate and, correlatively, it becomes more difficult to obtain good optical coupling with the material of the crystal disposed on the surface of the substrate and interacting with the light guide region. It is then very often necessary to use index liquids inserted between the birefringent crystal and the surface of the substrate. It is also difficult to select liquids having the appropriate refraction index.

It should also be noted that the birefringent crystal is an external element, that is to say added and not integrated in the substrate as is the wave guide, which may be considered as an additional disadvantage.

SUMMARY OF THE INVENTION

The invention relates to polarizing devices of this type, that is to say devices constructed in the form of an integrated optical structure operating by polarization separation.

The invention provides a structure overcoming the disadvantages of the prior art.

The invention provides a polarizing device with integrated optic structure of the type operating by spatial polarization separation, comprising a flat substrate made from a material having a first refraction index for a light wave polarized in a first direction and a second refraction index for a wave polarized in a second direction orthogonal to the first one, the substrate comprising a first region forming a wave guide obtained by material doping of the substrate modifying said refraction indices so as to obtain propagation in a guided mode of a light wave injected into this region, said flat substrate further comprising at least a second additional region interacting on the wave guided by the first region, having refraction indices for the waves polarized in said first and second directions satisfying simultaneously the two following relationships: $n_{1e} > n_{1I}$ and $n_{2e} < n_{2I}$, in which $n_{1e}$ and $n_{2e}$ are effective refraction indices associated with the waves guided by the first region, and polarized respectively in the first and second directions, and $n_{1I}$ and $n_{2I}$ are corresponding refraction indices of each second region; so as to allow guided mode propagation, in the first region, of a wave polarized in the first of said directions and cause extinction of a wave polarized in the second of said directions.

The invention further provides a process for manufacturing such a device.

BRIEF DESCRIPTION OF THE DRAWINGS

The invention will be better understood and other characteristics and advantages will be clear from reading the following description with reference to the accompanying Figures in which.

PRIOR ART

An example of a polarizing device of the type comprising a structure forming an integrated optical guide in a substrate will first of all be described with reference to FIG. 1.

This device is similar to the one described in the above mentioned article by UEHARA appearing in the revue "Applied Optics".

It comprises first of all a flat substrate 1. In the example described in the above mentioned article, it is a glass substrate but it may also be a crystal such as lithium niobate.

In the surface of this substrate, a guiding structure 2 is created, for example by a metal atom thermal diffusion process, so as to form a strip a few micrometers in thickness and width, extending, in the example illustrated, in a direction parallel to an axis, by convention the axis Z, of orthonormal trihedron XYZ.

For this region to form a wave guide, it is necessary for this region to have a refraction index higher than that of the substrate naturally for the wave length of the light to be guided, that is to say greater than about 1.5 if it is a question of glass.

For the device to operate as a polarizing element, a birefringent crystal plate 3 is disposed above the wave guide 2. The ordinary and extraordinary optical axes of the crystal may be parallel as in the example illustrated, respectively to axes Y and X. With a glass substrate, the birefringent crystal plate may be formed with a calcite base, having an ordinary index of 1.485 and an extraordinary index of 1.658 for a wave length of the order of 600 nm.

Thus, a light wave component polarized in a direction parallel to axis X remains guided and propagates in a direction parallel to Z whereas a light wave component polarized in a direction parallel to axis Y is no longer guided and is dispersed by diffraction within the birefringent crystal.

In actual fact, the diffusion procedure introduces disturbances into the surface state which result in a degradation of the inherent flatness.

Figure 1:
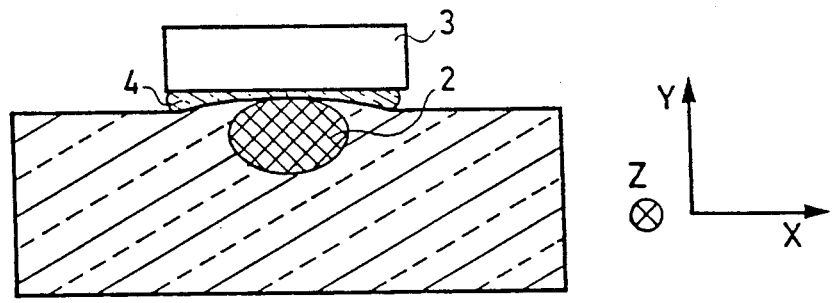
FIG. 1 shows an integrated optics structure polarizing device of the prior art.

So as to obtain good optical coupling between the birefringent crystal plate 3 and the surface of the substrate and of guide 2 flush with this surface, it is necessary either to carry out polishing with a tolerance typically less than $\lambda/50$, $\lambda$ being the wavelength, or to interpose an index liquid 4 as illustrated in FIG. 1, whose index is adapted to that of the crystal.

The optical coupling quality is critical and conditions the performance obtained with these types of polarizers.

The alignment of the optical axes of the birefringent crystal in preestablished directions must also be achieved accurately.

Finally, it is necessary to add an external element to the "substrate-wave guide" based integrated structure.

DESCRIPTION OF THE INVENTION

To overcome the disadvantages of the prior art and more particularly those presented by the device which has just been recalled and described briefly, the invention provides a polarizing structure which is entirely integrated in the substrate.

According to the main feature of the invention, there is provided within the material forming the substrate at least one region appropriately doped, in a way which will be described further on, so as to form an interaction region.

This region interacts with the guided wave.

The guided wave, as has already mentioned, may be divided into two components having polarizing directions orthogonal to each other. In what follows, these two components will be called $P_1$ and $P_2$.

According to another aspect of the invention, the dope is chosen so that if $n_{1e}$ represents the effective refraction index of the guided wave for component $P_1$; $n_{1I}$, the refraction index presented by the interaction region for this polarization state; $n_{2e}$, the effective refraction index of the guided wave for component $p_2$, and $n_{2I}$, the refraction index presented by the interaction region for this polarization state, the two following inequalities must be confirmed simultaneously:

$$n_{1e} > n_{1I} \qquad (1)$$

$$n_{2e} < n_{2I} \qquad (2)$$

Thus component $p_2$ will cease to be guided.

The effective attenuation rate of this component depends on numerous parameters and in particular on the geometry of the interaction region, on the distance over which the optical coupling between the wave guide and the interaction region has a significant value, and on the respective values of the indices appearing in the inequalities (1) and (2).

It may more especially be shown, by taking as basis the laws which govern optics, that the performances obtained, i.e. the value of the attenuation rate of component $P_2$, will be all the better the nearer $n_{2I}$ is to $n_{2e}$, in the inequality (2), while remaining greater than it. This inequality may then be rewritten so as to express this fact in the form:

$$n_{2e} \lesssim n_{2I} \qquad (2\ bis)$$

Figure 2:
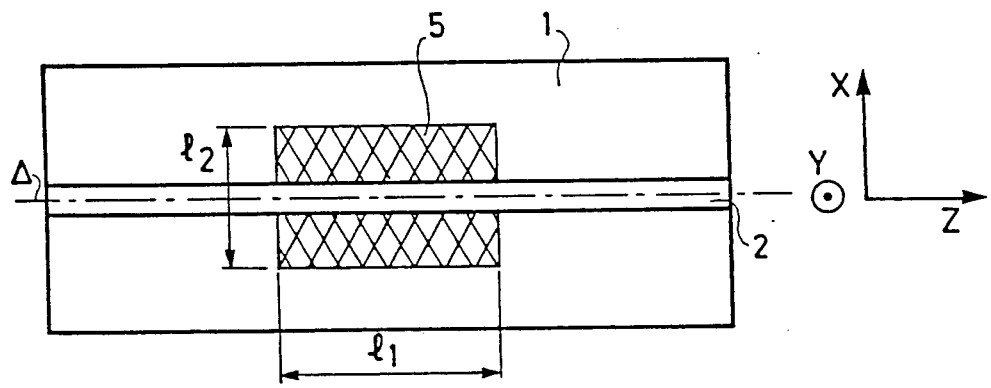
FIGS. 2 and 3 show a device in accordance with the invention in a first variant.
Figure 3:
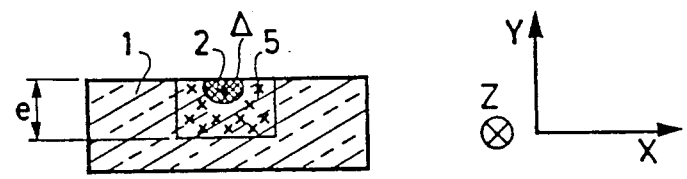

FIGS. 2 and 3 illustrate a polarizing structure in accordance with the invention in a first variant, FIG. 2 being a top view and FIG. 3 a sectional view.

We find again elements common to the structure of the prior art shown in FIG. 1, namely a flat substrate 1 and a region 2 forming a light wave guide extending along an axis Δ parallel conventionally to one of the axes, Z, of an orthonormal trihedron XYZ.

On the other hand, there has been formed within the substrate an interaction region 5 which, in the variant shown in FIGS. 1 and 2, has the general configuration of a rectangular parallelepiped disposed symmetrically with respect to axis Δ and by region 2 forming a wave gude.

The interaction between the guided wave and this region 2 is effected essentially over a distance $l_1$, representing in the example illustrated the length of the parallelepiped along axis Δ.

The configuration of the interaction region 5 shown in FIGS. 2 and 3 is not the only suitable one within the scope of the invention.

Figure 4:
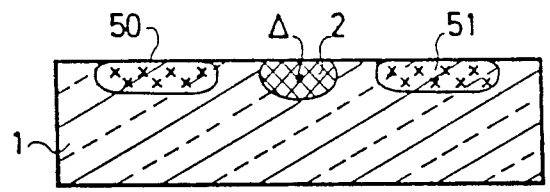
FIGS. 4 to 7 show additional variants of a device in accordance with the invention.
Figure 4:
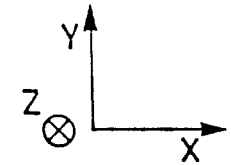

FIG. 4 shows another possible interaction region configuration.

The interaction region is formed in this variant from two separate regions 50 and 51 disposed on each side of axis Δ, symmetrically in the example illustrated.

The construction of such a configuration will be described in greater detail further on so as to illustrate more completely the process for manufacturing devices in accordance with the invention.

This configuration leaves the possibility of forming interaction regions during a step subsequent to the formation of the guided structure.

The two interaction regions 50 and 51, as shown in FIG. 4, are not necessarily contiguous with the wave guide region 2, but must be sufficient for the interaction to be significant. In fact, as is known, in the region of substrate 1 separating the wave guide 2 and the interaction regions 50 and 51, only an evanescent wave may be propagated, which wave has an exponentially decreasing amplitude. The attenuation rate of component $P_2$ greatly depends therefore on the distance separating the regions 50 and 51 from the central guide 2.

Although the configurations which have just been described with reference to FIGS. 2 to 4 have a symmetry with respect to axis Δ, this condition is in no wise imperative.

Figure 5:
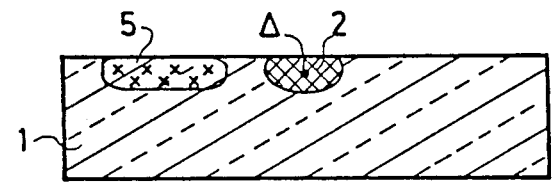
Figure 5:
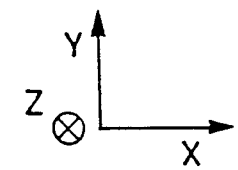

FIG. 5 illustrates an example of an asymmetrical configuration.

A single interaction region 5 is provided and disposed laterally to the wave guide 2.

The interaction region need not necessarily be flush with the surface of the substrate. Although more difficult to form from a technological point of view, the interaction region may be of the buried type.

Figure 6:
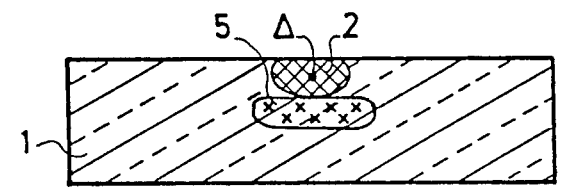
Figure 6:
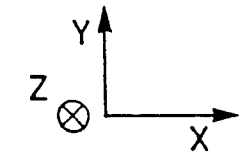

FIG. 6 illustrates such an arrangement. The interaction region 5, contiguous with the wave guide 2, is disposed below the wave guide region 2.

Finally, the interaction zone may comprise several regions distributed, regularly or not, along the wave guide 2 (parallel to axis Z) so as to form a distributed, even periodic, structure.

Figure 7:
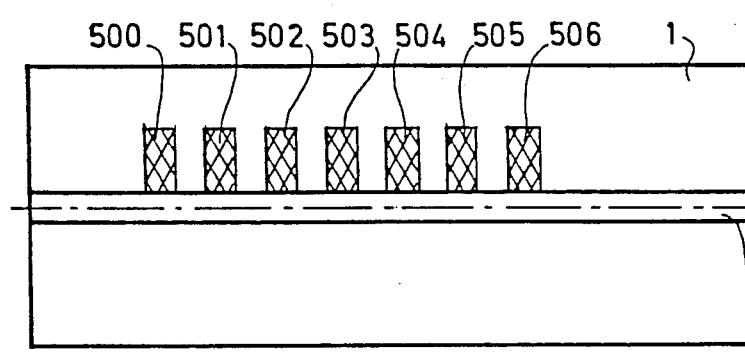
Figure 7:
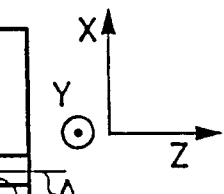

FIG. 7 shows such a configuration. Seven regions 500 to 506 are provided in this example disposed asymmetrically with respect to the wave guide 2, along axis Z.

As has already been mentioned, the structures which have just been described do not form limiting examples. All variations within the scope of a man skilled in the art, in particular combinations between the configurations described, come within the scope of the invention.

The process for manufacturing such polarizing device structures will now be described in greater detail on the basis of the particular structure shown in FIG. 4.

The process comprises the steps common to the prior art of forming the substrate and the guided structure within this substrate.

The substrate may be formed, by way of example, from a lithium niobate crystal wafer, shaped so that the optical axis of the crystal is orthogonal to the main faces of the substrate 1, i.e orthogonal to the plane XZ according to the conventions adopted.

During the second step, a strip having a section of a few square micrometers is created within the crystal substrate 1 flush with the surface. For this, for example by using a thermal diffusion method, a material raising the refraction index of the material of the substrate is introduced therein. For lithium niobate, titanium may be chosen. The diffusion takes place at a typical temperature of 1050° C. The width of the titanium strip before diffusion is of the of the order of 2 micrometers and its thickness of the order of 500 Å.

This structure will guide whatever the polarization state of a light wave injected through the edge of the strip thus created.

The light propagates then along axis Δ without appreciable attenuation and leaves through the opposite edge.

The length of the wave guide 2 and so of the substrate wafer 1 is typically on the order of a few centimeters.

Then on the surface of the substrate, there is disposed, during a first step specific to the invention, a mask which only leaves uncovered total surface zones equal to a few millimeters square. This mask may be formed from a thin gold film.

These uncovered zones are intended to define regions which will become the interaction regions. Referring again to FIG. 4, the uncovered zones are in the form of two window disposed on each side of the wave guide strip 2.

During the second step specific to the invention, the material of the substrate is doped in the zones left uncovered by the mask so as to create the interaction regions by modifying the ordinary and extraordinary refraction indices of these regions.

For this, ions of the material forming the substrate, lithium ions in the example described, may be exchanged for hydrogen ions so as to modify the ordinary and extraordinary refraction indices of the uncovered regions.

These regions are spaced from the wave guide 2 by a few micrometers, and have as typical dimensions: length (along axis Z) equal to 8 mm and width (along axis Z) equal to 200 micrometers. The thickness is on the same order of size as that of the wave guide 2.

One method which may be used consists in immersing the substrate in an acid bath, for example molten benzoic acid. The crystal then loses lithium ions which are replaced by hydrogen ions by an ionic exchange procedure.

Besides gold, most metals withstand this acid and may be used as a mask.

Other acids may be used and, depending on their strengths and reaction times, doping of the regions left uncovered by the mask may be adjusted. In fact, the substitution of ions, at least in the surface layers of the crystal forming the substrate, may be total or on the contrary partial.

Thus, the refraction indices may be adjusted and this forms an additional advantage offered by the invention.

Referring to the inequalitites (2) and (2bis), an index $n_{2I}$ close to index $n_{2e}$ may be obtained.

In the case of a device of the prior art such as the one described with reference to FIG. 1, the choice of the crystal determines this index once and for all for a given orientation of the birefringent crystal. It is only possible to vary this index by orientating the crystal wafer differently and so its ordinary and extraordinary optical axes with respect to the direction of propagation of the guided wave (axis Z), which involves mechanical adjustments delicate to make.

A last step consists in destroying the mask, if necessary, which mask may be removed in the usual way by chemical means.

The order of the steps may naturally be changed if it is desired to form a structure of the type illustrated in FIGS. 2 and 3. The interaction region 5 must in this case be formed before the wave guide 2.

Instead of hydrogen ions, other ions may be used for modifying the refraction indices of the substrate, for example vanadium ions, still in the example illustrated in which the substrate is made from lithium niobate.

Other methods such as thermal diffusion, or ionic implantation may be chosen for doping the interaction region or regions. In the case of vanadium ions, thermal diffusion is preferably used.

By way of example, to give an idea, a prototype was formed with a substrate made from lithium niobate, Li Nb O$_3$; an integrated guide obtained by doping with titanium, Li Nb O$_3$: Ti; and interaction regions in which partial substitution of lithiums ions by hydrogen ions was effected. In the general case, the resulting material has a composition of formula $Li_{1-x}H_xNbO_3$, with $x<1$.

The distribution of the refraction indices obtained is shown in Table 1 following the description.

With this index distribution, an attenuation of a light wave component with polarizing direction parallel to axis Y was noted greater than 30 db.

Besides the direct application of the invention as an individual polarizing device, that is to say as a discrete optical component, the invention may be used in numerous other devices such as integrated amplitude modulator or optical isolating element, without appreciable modification.

In fact, with the arrangement proper to the invention, one or more intgrated polarizing elements may be created in existing devices without changing the structure thereof, the only condition being that an integrated wave guide exists in a substrate. These polarizing elements are then combined with other optical elements and this advantageous arrangement allows high integration.

TABLE 1

| Refraction index | Substrate 1 | Wave guide 2 | Interaction Regions 50 and 51 |
|---|---|---|---|
| Ordinary Polarization | 2.270 | 2.275 | 2.170 |
| Extraordinary Polarization | 2.200 | 2.275 | 2.320 |

We claim:

1. An integrated optical structure polarizing device of the type operating by spatial polarization separation, comprising a flat substrate formed from a material having a first refraction index for a light wave polarized in a first direction and a second refraction index for a light wave polarized in a second direction orthogonal to said first direction, said substrate including:
   a first wave guide region formed by doping the material of the substrate to modify said refraction indices so as to obtain guided mode propagation of a light wave injected into said first region; and
   at least a second region interacting with the wave guided by the first region, and having refraction indices for the waves polarized in said first and second directions satisfying simultaneously the two following relationships: $n_{1e}>n_{1I}$ and $n_{2e}<n_{2I}$, in which $n_{1e}$ and $n_{2e}$ are effective refraction indices associated with waves guided by the first region, polarized respectively in the first and second directions, and $n_{1I}$ and $n_{2I}$ are the corresponding refraction indices of each second region, so as to allow the guided mode propagation, in the first region, of a wave polarized in the first of said directions and to cause extinction of a wave polarized in the second of said directions, and second region being located in proximity to said first region but noncoextensive therewith.

2. The device as claimed in claim 1, wherein, said first wave guide region is in the form of an elongate strip flush with one of the main faces of said flat substrate and having an axis of symmetry parallel to this main face, within which a light wave is propagated in guided mode in a direction parallel to said axis of symmetry, and wherein said at least one second region has the form of a rectangular parallelepiped one of whose sides is parallel to the said axis of symmetry.

3. The device as claimed in claim 2, wherein said flat substrate has a single second region contiguous with said first region, disposed symmetrically with respect to said axis of symmetry, having a thickness greater than the thickness of said first region and projecting therefrom on each side of said axis of symmetry so as to surround said first region over a given distance.

4. The device as claimed in claim 2, wherein said flat substrate includes a single second region disposed asymmetrically with respect to said axis of symmetry.

5. The device as claimed in claim 2, wherein said flat substrate includes a single second region buried within said substrate.

6. The device as claimed in claim 2, wherein said flat substrate includes at least two second regions disposed on each side of said axis of symmetry.

7. The device as claimed in claim 2, wherein said substrate includes a plurality of second regions spaced apart along a direction parallel to said axis of symmetry.

8. The device as claimed in claim 1, wherein said flat substrate is made from lithium niobate and said first region is doped by insertion of titanium ions, and wherein, in each second region, a part of the lithium ions of the lithium niobate has been replaced by hydrogen ions so as to modify said refraction indices.

9. The device as claimed in claim 1, wherein said flat substrate is made from lithium niobate, said first region is doped by insertion of titanium ions and said at least one second region is doped by diffusion of vanadium ions in the lithium niobate so as to modify said refraction indices.

* * * * *